3,073,745
ANTI-NAUSEA COMPOSITIONS
John J. Miskel, East Orange, N.J., assignor to White Laboratories, Inc., Kenilworth, N.J., a corporation of New Jersey
No Drawing. Filed May 8, 1961, Ser. No. 108,313
5 Claims. (Cl. 167—65)

This invention relates to new compositions of matter useful in the treatment of prenatal nausea and to processes for the treatment of nausea utilizing such compositions.

Prenatal nausea has always been a serious problem. It is estimated that at least seventy-five percent of all pregnancies are characterized by nausea and vomiting varying from mild incidences to cases of pernicious vomiting. There appears to be no safe method for predicting when the simple nausea and vomiting of any pregnant woman will gradually or suddenly take on the aspects which can change it to a serious and dangerous complication. It has been reported that nutritional and biochemical abnormalities result in pregnancy which can be corrected by the administration of pyridoxine hydrochloride, and vitamin $B_6$ is known to be of value in controlling the nausea syndrome. It has been suggested that the beneficial results obtained are due to a return to a normal protein metabolism in the pregnant woman.

Some of the phenothiazine tranquilizers, which possess antiemetic properties in addition to their ataractic function have been employed in controlling the nausea of pregnancy. However, at their usual dosage level these drugs have serious side effects which in many cases limit the duration of their use to several weeks sustained administration. The side effects include potential blood dyscrasia and extrapyramidal symptoms which increase in frequency and severity with increased dosage. The extrapyramidal effects are characterized by muscular spasm similar to that observed in Parkinson's disease. Further the anti-emetic effect provided by these drugs may obscure signs of toxicity or overdosage.

One drawback of relying on vitamin $B_6$ as the sole means of controlling prenatal nausea has been some of the erratic results obtained in a large segment of the pregnant population. In tests on pregnant women, some receiving supplementary vitamin $B_6$ and others not, blood and urine analyses revealed far more marked fluctuations in vitamin $B_6$ levels in both groups than had been expected. These variations reflected increased growth and nutritional demands of the fetus, which in effect created a relative vitamin $B_6$ deficiency in the mother. As a result of these studies, it has been recommended that larger amounts of the vitamin be administered to pregnant women. And efforts had been to stabilize the anti-emetic nutritional value of pyridoxine hydrochloride by combining it with antihistamines of the benzhydryl type such as cyclizine, meclizine, chlorpheniramine, dimenhydrinate, and the like. These combinations appear to have been of some improvement. However, their use has been plagued by side effects primarily reflected in increased drowsiness, anorexia, etc.

The present invention resides in the concept of vitamin $B_6$ compositions having fluphenazine dihydrochloride added thereto, and the process for treating nausea which comprises the oral administration of dosage units of such compositions.

The present invention is based on the discovery that the somewhat erratic performance of vitamin $B_6$ pyridoxine hydrochloride in the control of prenatal nausea can be improved markedly without fear of side-effects through the addition of fluphenazine dihydrochloride, 4-(3 - [2 - (trifluoromethyl)-10-phenothiazinyl]propyl)- 1-piperazineethanol dihydrochloride. The combination preparation is more effective and positive in the control of prepartum nausea than either drug alone.

The anti-emetic activity of certain phenothiazines is discussed by Laffan et al. in J. Pharmacology and Experimental Therapeutics, 131, 130 (1960), where the effectiveness of fluphenazine was compared with that of chlorpromazine, perphenazine, and triflurpromazine. The superior anti-emetic attributes of fluphenazine were not accompanied by an undesired increase in sedative action usually found in compounds of this type. It is noted that use of phenothiazine compounds in conjunction with vitamin $B_6$ has not been reported in the literature.

Fluphenazine dihydrochloride is an ataractic drug of very high potency in dosages ranging from 0.5 milligram to 2.0 milligram. This dosage level is far below the level that will produce side effects or toxic reactions. The combination product containing 10 to 200 milligrams of vitamin $B_6$ corrects the pyridoxine deficiency inherent in pregnancy and synergistically increases the effectiveness of pyridoxine as an anti-emetic in this condition. The ataractic properties of the combination are also of considerable importance in controlling the anxiety factor as related to prenatal nausea.

For patient convenience and to capitalize on the inherent long-acting effects of fluphenazine dihydrochloride, the combination drug is preferably built into a repeat-action tablet where all of the pyridoxine and a portion of the fluphenazine are released immediately in the stomach for early absorption in the gastrointestinal tract. A barrier coating on the tablet separates the immediately released portion of the tablet from the remaining fluphenazine dihydrachloride which is then released in the intestine for absorption over a period of three to four hours.

The preferred compositions of this invention are usually made available in tablet form according to the following formulation:

*Formula*

| | Milligrams per Tablet |
|---|---|
| Core: | |
| Fluphenazine dihydrochloride | 0.5 |
| Dibasic calcium phosphate | 46.5 |
| Lactose | 45.0 |
| Starch | 7.0 |
| Magnesium stearate | 1.0 |
| Distilled water | ---- |
| | 100.0 |
| Coating: | |
| Fluphenazine dihydrochloride | 0.5 |
| Pyridoxine hydrochloride | 50.0 |
| Sucrose | 105.25 |
| Acacia | 4.67 |
| Gelatin | 0.48 |
| Calcium carbonate | 93.50 |
| Rosin | 3.95 |
| Oleic acid | 0.93 |
| Zein | 2.38 |
| Eiderdown soap | 0.16 |
| Talc | 26.13 |
| Stearic acid | 0.58 |
| Super-floss | 1.00 |
| Kaolin | 0.34 |
| Color and wax | 0.13 |
| | 290.0 |

Total tablet weight—390.0 milligrams.

PROCEDURE

*Core.*—A granulation is made of the fluphenazine dihydrochloride, starch, lactose, and Amijel with water. The granulation is dried and screened. The magnesium stearate is mixed with the granulation and the final mixture is compressed into tablet cores.

*Coatings.*—One coat of 3 pound cut pharmaceutical glaze is applied to the tablet cores and allowed to dry for 15 minutes. Then a wetting syrup (acacia, gelatin, sugar, and water) is applied to the tablets followed by a dusting powder (precipitated calcium carbonate, acacia, sugar). This application is repeated 4 times. Next, a smoothing syrup (calcium carbonate, acacia, sugar, and water) is applied (11 applications). The smoothing syrup is followed by several coats of lacquer (a solution of rosin, oleic acid, zein, and eiderdown in alcohol) and then a dusting powder of sugar and talc. The tablets are then dried in trays overnight at 40 degrees centigrade.

The tablets are then wetted with a syrup (acacia, gelatin, sugar and water) and dusted with an intimate mixture of the fluphenazine dihydrochloride and pyridoxine hydrochloride. The tablets are then dried overnight in trays at 45 degrees centigrade.

The next day the tablets are sealed with lacquer (rosin, oleic acid, zein and eiderdown in alcohol) and then dusted with a mixture of stearic acid, Super-Floss, kaolin and rosin.

A smoothing syrup is applied next (calcium carbonate, acacia and sugar). The weight at this point is 325 milligrams. This is followed by repeated applications of sugar syrup containing the colorant. Tablet weight 390 milligrams. After drying overnight in trays at room temperature, the tablets are polished with a solution of carnauba wax and white wax in chloroform.

The employment of the combination drug in the tablet design described as a nausea control measure requires usually only one tablet on retiring. In very severe cases a second tablet may be administered on arising.

The present invention resides in the concept of novel compositions of matter containing 10 to 200 milligrams of vitamin $B_6$ and 0.25 to 2.0 milligrams of fluphenazine dihydrochloride. Other acid addition salts of fluphenazine are equivalent thereto if adjustments are made so that the weights of fluphenazine free base, the active constituent, fall in the same weight range. In addition to pyridoxine hydrochloride, vitamin $B_6$ also refers to codecarboxylase, pyridoxal hydrochloride and pyridoxamine dihydrochloride. It is contemplated that tablets or other pharmaceutically equivalent forms suitable for oral administration containing the above amounts of active ingredients be taken once or twice daily to control prenatal nausea.

The nature of the vehicle employed is not an essential part of this invention. Various modifications in tablet compounding, for example, will suggest themselves to those skilled in the art and such modifications fall within the scope of this invention. The subject matter which the applicant regards as his invention is particularly pointed out and claimed as follows:

1. Anti-prenatal nausea compositions containing 10 to 200 milligrams of pyridoxine and 0.25 to 2.0 milligrams of fluphenazine dihydrochloride.
2. Anti-prenatal nausea compositions containing 50 milligrams of pyridoxine and 1.0 milligram of fluphenazine dihydrochloride.
3. The method of treating prenatal nausea which comprises the oral administration of dosage units of pyridoxine and fluphenazine dihydrochloride.
4. The method of treating prenatal nausea which comprises the daily oral administration of compositions containing 10 to 200 milligrams of pyridoxine and 0.25 to 2.0 milligrams of fluphenazine dihydrochloride.
5. The method of treating prenatal nausea which comprises the daily oral administration of compositions containing 50 milligrams of pyridoxine and 1 milligram of fluphenazine dihydrochloride.

References Cited in the file of this patent

Geiger et al.; Obstetrics and Gynecology (N.Y.), 14:689–90, November 1959.

Davitti et al.; Minerva Ginecologia, 11:1065–8, December 1959.

Davidson: Journal of Tenn. Medical Assoc., 53:140–2, April 1960.

Bethea: International Record of Medicine, 173:283–7, May 1960.

The Merck Index, 7th ed., page 856, "Prolixin," 1960, published by Merck and Co. Inc., Rahway, New Jersey.

UNITED STATES PATENT OFFICE
CERTIFICATE OF CORRECTION

Patent No. 3,073,745

January 15, 1963

John J. Miskel

It is hereby certified that error appears in the above numbered patent requiring correction and that the said Letters Patent should read as corrected below.

Column 1, line 53, for "had been to" read -- had been made to --; column 2, line 6, for "(1960)" read -- (1961) --; line 16, for "0.5" read -- 0.25 --; line 34, for "dihydrachloride" read -- dihydrochloride --.

Signed and sealed this 6th day of August 1963.

(SEAL)
Attest:

ERNEST W. SWIDER
Attesting Officer

DAVID L. LADD
Commissioner of Patents